(12) United States Patent
Jeong et al.

(10) Patent No.: US 12,376,164 B2
(45) Date of Patent: Jul. 29, 2025

(54) METHOD AND APPARATUS FOR SUPPORTING INTER-SYSTEM MOBILITY IN WIRELESS COMMUNICATION SYSTEMS

(71) Applicant: SAMSUNG ELECTRONICS CO., LTD., Suwon-si (KR)

(72) Inventors: Sangsoo Jeong, Suwon-si (KR); Hoyeon Lee, Suwon-si (KR); Jinuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 17/995,272

(22) PCT Filed: Mar. 29, 2021

(86) PCT No.: PCT/KR2021/003860
§ 371 (c)(1),
(2) Date: Sep. 30, 2022

(87) PCT Pub. No.: WO2021/201535
PCT Pub. Date: Oct. 7, 2021

(65) Prior Publication Data
US 2023/0156832 A1 May 18, 2023

(30) Foreign Application Priority Data

Mar. 31, 2020 (KR) .................. 10-2020-0039438

(51) Int. Cl.
*H04W 76/12* (2018.01)
*H04W 8/02* (2009.01)
*H04W 8/20* (2009.01)

(52) U.S. Cl.
CPC ............ *H04W 76/12* (2018.02); *H04W 8/02* (2013.01); *H04W 8/20* (2013.01)

(58) Field of Classification Search
CPC .......... H04W 76/12; H04W 8/02; H04W 8/20
(Continued)

(56) References Cited

U.S. PATENT DOCUMENTS 10,791,508 B2   9/2020   Park et al.
11,350,356 B2   5/2022   Yang et al.
(Continued)

FOREIGN PATENT DOCUMENTS

CN   109076422 A   12/2018
CN   110663284 A    1/2020
(Continued)

OTHER PUBLICATIONS

Extended European Search Report dated Jul. 7, 2023, in connection with European Patent Application No. 21779436.1, 14 pages.
(Continued)

*Primary Examiner* — Nghi H Ly

(57) ABSTRACT

A method of supporting inter-system mobility of a first entity includes receiving a create session request message including information about an Access Point Name (APN), for which a user equipment requests a packet data network (PDN) connection, subscriber identification information of the user equipment, and a field indicating capability information of the user equipment about slice identification information, determining, based on the create session request message, whether movement to a 5G system (5GS) is required for the PDN connection, transmitting, based on a result of the determining, to a second entity, a subscriber information request including the subscriber identification information and the APN information, receiving, from the second entity, a response to the subscriber information request including identification information of one or more subscribed network slices corresponding to the subscriber identification information, and providing, to the user equip-
(Continued)

ment, at least one piece of identification information of the one or more subscribed network slices.

13 Claims, 9 Drawing Sheets

(58) Field of Classification Search
USPC .......... 455/422.1, 435.1, 432.1, 414.1, 418
See application file for complete search history.

(56) References Cited

U.S. PATENT DOCUMENTS

| | | | |
|---|---|---|---|
| 2020/0126416 A1* | 4/2020 | Montemurro | H04W 4/44 |
| 2020/0163008 A1* | 5/2020 | Hedman | H04L 41/5045 |
| 2020/0252900 A1 | 8/2020 | Kim et al. | |
| 2021/0345187 A1 | 11/2021 | Jin et al. | |
| 2022/0182120 A1* | 6/2022 | Sergeev | H04B 7/0469 |
| 2022/0256436 A1* | 8/2022 | Guo | H04L 47/34 |

FOREIGN PATENT DOCUMENTS

| | | |
|---|---|---|
| EP | 3487216 A1 | 5/2019 |
| EP | 3884707 A1 | 9/2021 |
| EP | 4175367 A1 | 5/2023 |
| KR | 10-2019-0082897 A | 7/2019 |
| WO | 2019078964 A1 | 4/2019 |
| WO | 2019205027 A1 | 10/2019 |

OTHER PUBLICATIONS

3GPP TS 23.501 V1 6.4.0 (Mar. 2020), 3rd Generation Partnership Project; Technical Specification Group Services and System Aspects; System architecture for the 5G System (5GS); Stage 2 (Release 16) Mar. 2020, 430 pages.
Notice of Allowance dated Jul. 4, 2023, in connection with Japan Patent Application No. 2022-559519, 5 pages.
Huawei, "Retrieve subscribed S-NSSAIs from UDM by PGW+ SMF", C4-193189, 3GPP TSG CT WG4 #93, Wroclaw, Poland; Aug. 26-30, 2019, 2 pages.
Samsung et al., "TS 23.502: OI#2. The role of NSSF in roaming", S2-177452, 3GPP TSG SA WG2 #123, Oct. 23-27, 2017, Ljubljana, Slovenia, 14 pages.
International Search Report and Written Opinion of the International Searching Authority dated Jun. 25, 2021, in connection with International Application No. PCT/KR2021/003860, 15 pages.
Ericsson, "PGW Selection and the Create Session Request message", C4-201179, 3GPP TSG CT WG4 Meeting #96-e, Feb. 17-28, 2020, 42 pages.
Ericsson, "Emergency service at EPC-5GC interworking", S2-2000283, 3GPP TSG SA2 Meeting #136AH, Incheon, KR, Jan. 13-17, 2020, 12 pages.
Qualcomm Incorporated, "Support for the signaling of the capability for receiving WUS assistance information", C1-201058, 3GPP TSG CT WG1 Meeting #122-e, Feb. 20-28, 2020, 50 pages.
Ericsson, "Selecting the same PCF for AMF and an SMF in interworking scenarios", S2-2001931, 3GPP TSG SA WG2 Meeting #137-e, Feb. 24-27, 2020, 4 pages.
Office Action issued Sep. 28, 2024, in connection with Korean Patent Application No. 10-2020-0039438, 6 pages.
The First Office Action issued Feb. 27, 2025, in connection with Chinese Patent Application No. 202180036808.3, 22 pages.

* cited by examiner

METHOD AND APPARATUS FOR SUPPORTING INTER-SYSTEM MOBILITY IN WIRELESS COMMUNICATION SYSTEMS

CROSS-REFERENCE TO RELATED APPLICATIONS

This application is a 371 of International Application No. PCT/KR2021/003860, filed Mar. 29, 2021, which claims priority to Korean Patent Application No. 10-2020-0039438, filed Mar. 31, 2020, the disclosures of which are herein incorporated by reference in their entirety.

BACKGROUND

1. Field

The present disclosure relates to a method and apparatus for providing a service in a wireless communication system, and more particularly, to a method and apparatus for providing inter-system mobility support in a wireless communication system.

2. Description of Related Art

To meet the ever-increasing demand with respect to wireless data traffic since the commercialization of the 4th generation (4G) communication system, there have been efforts to develop an advanced 5th generation (5G) or pre-5G communication system. For this reason, the 5G or pre-5G communication system is also called a beyond 4th-generation (4G) network communication system or post long term evolution (LTE) system.

Implementation of the 5G communication system using ultra-high frequency (millimeter wave (mmWave)) bands, e.g., 60 giga hertz (GHz) bands, is being considered to attain higher data transfer rates. To reduce propagation loss of radio waves and increase a transmission range of radio waves in the ultra-high frequency bands, beamforming, massive multiple-input multiple-output (MIMO), full dimensional MIMO (FD-MIMO), array antenna, analog beamforming, and large-scale antenna techniques are under discussion.

Also, in order to improve networks of systems, in 5G communication systems, development of technologies such as evolved small cell, advanced small cell, cloud radio access network (cloud RAN), ultra-dense network, device-to-device (D2D) communication, wireless backhaul, moving network, cooperative communication, coordinated multi-points (CoMP), and interference cancellation of the receiving end is underway.

In addition, for 5G systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

With the development of various information technology (IT), network equipment has evolved into virtualized network function (NF) due to application of virtualization technology, and the virtualized NFs are freed from physical constraints and implemented in the form of software and can be installed/operated in various types of clouds or data centers (DCs). In particular, the NF may be freely expanded or scaled, installed (initiated) or terminated according to service requirements, system capacity, and network load.

In order to support various services in these various network structures, a network slicing technology has been introduced. Network slicing is a technology that logically configures a network with a set of network elements (NFs) to support a certain service, and separates the same from other slices. One user equipment may access two or more slices when receiving various services.

SUMMARY

The present disclosure provides an apparatus and method for effectively providing a service in a wireless communication system.

An objective of the present disclosure is to provide an effective wireless communication system.

The present disclosure provides an apparatus and method for effectively providing a service in a wireless communication system.

DETAILED DESCRIPTION

Figure 1:
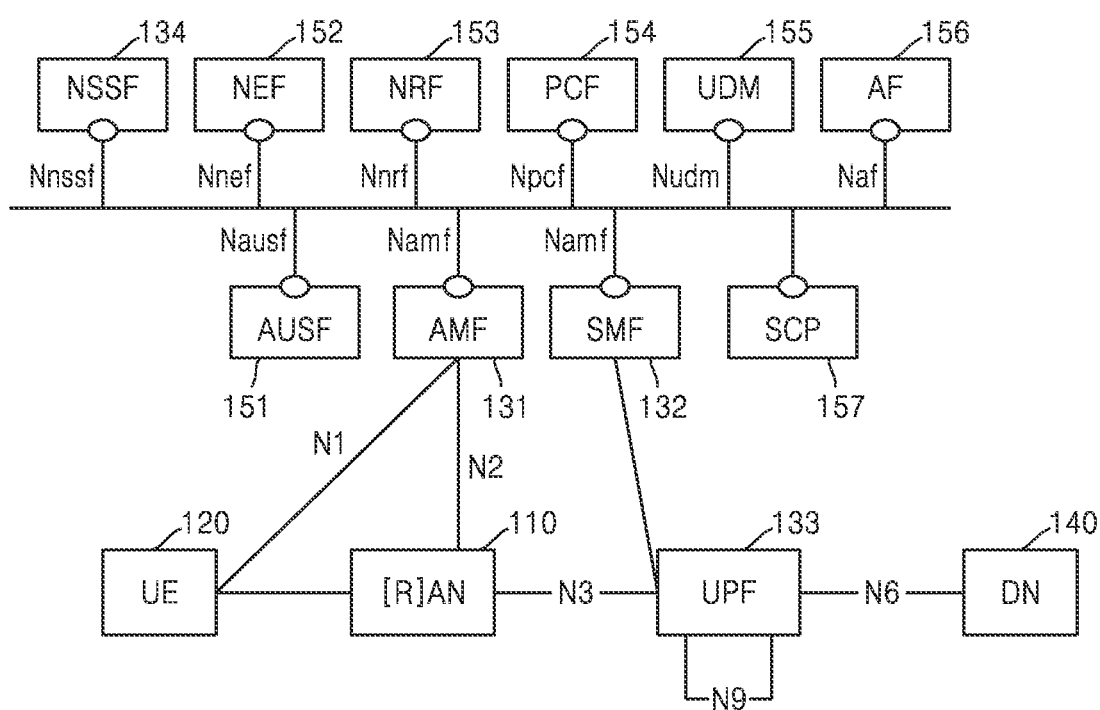
FIG. 1 illustrates a wireless communication system according to an embodiment of the present disclosure.

According to an embodiment of the present disclosure, a method of supporting inter-system mobility of a first entity includes receiving a create session request message including information about an Access Point Name (APN), for which a user equipment requests a packet data network (PDN) connection, subscriber identification information of the user equipment, and a field indicating capability information of the user equipment about slice identification information, determining, based on the create session request message, whether movement to a 5G system (5GS) is required for the PDN connection, transmitting, based on a result of the determining, to a second entity, a subscriber information request including the subscriber identification information and the APN information, receiving, from the second entity, a response to the subscriber information request including identification information of one or more subscribed network slices corresponding to the subscriber identification information, and providing, to the user equipment, at least one piece of identification information of the one or more subscribed network slices.

The capability information of the user equipment about slice identification information may include information indicating whether the user equipment is able to receive two or more pieces of network slice identification information, and the providing of the at least one piece of identification information of the one or more subscribed network slices to the user equipment may include includes providing, to the user equipment, one piece of identification information of the one or more subscribed network slices or a plurality of pieces of network slice identification information, based on the field indicating the capability information of the user equipment about slice identification information.

The at least one piece of identification information of the one or more subscribed network slices provided to the user equipment may be included in a certain field in a create session response message.

The method may further include transmitting, to a third entity, a message requesting to select a network slice based on the identification information of the one or more subscribed network slices, and receiving a response message including one or more pieces of slice identification information selected by the third entity among the identification information of the one or more subscribed network slices.

The providing of the at least one piece of identification information of the one or more subscribed network slices to the user equipment may include transmitting at least one piece of the selected slice identification information, to the user equipment.

When a response to the subscriber information request includes two or more pieces of network slice identification information, the response to the subscriber information request may include information for determining a default network slice, or information about priorities among the two or more pieces network slice identification information.

The at least one piece of identification information of the one or more subscribed network slices provided to the user equipment may be used when the user equipment moves to the 5GS.

The first entity may include a combo node of a PDN gate way control (PGW-C) of an Evolved packet system (EPS) and a Session Management Function (SMF) of the 5GS, the second entity may include one of Unified Data Management (UDM), Home Subscriber Server (HSS), Unified Data Repository (UDR), and the third entity may include a Network Slice Selection Function (NSSF).

According to an embodiment of the present disclosure, a communication method performed by a user equipment receiving network slice identification information, includes transmitting, to a Mobility Management Entity (MME), a Packet Data Network (PDN) connection request message including information about a certain Access Point Name (APN), receiving, as a response to the connection request message, a response message including at least one piece of network slice information corresponding to the APN, and storing the at least one piece of network slice information of the response message, wherein the at least one piece of network slice information is used when the user equipment moves to a 5G system (5GS).

According to an embodiment of the present disclosure, a first entity supporting inter-system mobility, includes a transceiver, and a processor coupled to the transceiver and configured to receive a create session request message including information about an Access Point Name (APN), for which a user equipment requests a packet data network (PDN) connection, subscriber identification information of the user equipment, and a field indicating capability information of the user equipment about slice identification information, determine, based on the create session request message, whether movement to a 5G system (5GS) is required for the PDN connection, transmit, based on a result of the determining, to a second entity, a subscriber information request including the subscriber identification information and the APN information, receive, from the second entity, a response to the subscriber information request including identification information of one or more subscribed network slices corresponding to the subscriber identification information, and provide, to the user equipment, at least one piece of the identification information of the one or more subscribed network slices.

The capability information about the slice identification information of the user equipment may include information indicating whether the user equipment is able to receive two or more pieces of network slice identification information.

The processor may be further configured to provide, to the user equipment, one piece of identification information of the one or more subscribed network slices or a plurality of pieces of network slice identification information, based on the field indicating the capability information about the slice identification information of the user equipment.

The at least one piece of identification information of the one or more subscribed network slices provided to the user equipment may be included in a certain field in a create session response message.

The processor may be further configured to transmit, to a third entity, a message requesting to select a network slice based on the identification information of the one or more subscribed network slices.

The processor may be further configured to receive a response message including one or more pieces of slice identification information selected by the third entity among the identification information of the one or more subscribed network slices, and transmit at least one piece of the selected slice identification information, to the user equipment.

When the response to the subscriber information request includes two or more pieces of network slice identification information, the response to the subscriber information request may include information for determining a default network slice, or information about priorities among the two or more pieces of network slice identification information.

The first entity may include a combo node of a PDN gate way control (PGW-C) of an Evolved packet system (EPS) and a Session Management Function (SMF) of 5GS, the second entity may include one of Unified Data Management (UDM), Home Subscriber Server (HSS), Unified Data Repository (UDR), and the third entity may include a Network Slice Selection Function (NSSF).

According to an embodiment of the present disclosure, user equipment configured to receive network slice identification information includes a transceiver, and a processor coupled to the transceiver and configured to transmit, to a Mobility Management Entity (MME), a Packet Data Network (PDN) connection request message including information about a certain Access Point Name (APN), receive, as a response to the connection request message, a response message including at least one piece of network slice information corresponding to the APN, and store the at least one piece of network slice information of the response message.

The at least one piece of network slice information may be used when the user equipment moves to a 5G system (5GS).

Hereinafter, embodiments of the present disclosure will be described in detail with reference to the attached drawings. While describing the present disclosure, detailed descriptions of related well-known functions or configurations that may blur the points of the present disclosure are omitted. The terms used herein are those defined in consideration of functions in regard to the present disclosure, but the terms may vary according to the intention of users or operators, precedents, etc. Thus, the terms used in the specification should be understood based on the overall description of the present disclosure.

The advantages and features of the present disclosure and methods of achieving them will become apparent with reference to embodiments of the present disclosure described in detail below along with the attached drawings. The present disclosure may, however, be embodied in many different forms and should not be construed as limited to embodiments of the present disclosure set forth herein; rather these embodiments of the present disclosure are provided so that this disclosure will be thorough and complete, and will fully convey the scope of the present disclosure to one of ordinary skill in the art, and the scope of the present disclosure is defined only by the accompanying claims. In the specification, the same reference numerals denote the same elements.

It will be understood that blocks in flowcharts or combinations of the flowcharts may be performed by computer program instructions. Because these computer program instructions may be loaded into a processor of a general-purpose computer, special purpose computer, or other programmable data processing apparatus, the instructions, which are executed via the processor of the computer or other programmable data processing apparatus generate means for implementing the functions specified in the flowchart block(s). These computer program instructions may also be stored in a computer-executable or computer-readable memory that may direct a computer or other programmable data processing equipment to function in a particular manner, such that the instructions stored in the computer-executable or computer-readable memory produce a manufactured article including instruction means that perform the functions specified in the flowchart block(s). The computer program instructions may also be loaded onto a computer or other programmable data processing equipment to cause a series of operational steps to be performed on the computer or other programmable data processing equipment to produce a computer-executable process such that the instructions that are executed on the computer or other programmable data processing equipment provide steps for implementing the functions specified in the flowchart block(s).

Also, each block of the flowchart illustrations may represent a module, segment, or portion of code, which includes one or more executable instructions for implementing the specified logical function(s). It should also be noted that in some alternative implementations, the functions noted in the blocks may occur out of the order shown. For example, two consecutive blocks may also be executed simultaneously or in reverse order depending on functions corresponding thereto.

As used herein, the term " . . . unit" denotes a software element or a hardware element such as a field-programmable gate array (FPGA) or an application-certain integrated circuit (ASIC), and performs a certain function. However, " . . . unit" does not mean to be limited to software or hardware. The term " . . . unit" may be configured to be in an addressable storage medium or configured to operate one or more processors. Thus, the term ' . . . unit' or ' . . . er(or)' may include, by way of example, object-oriented software components, class components, and task components, and processes, functions, attributes, procedures, subroutines, segments of a program code, drivers, firmware, a micro code, a circuit, data, a database, data structures, tables, arrays, and variables. The functionality provided in components and " . . . units" may be combined into fewer components and " . . . units" or further separated into additional components and " . . . units". Further, components and " . . . units" may be implemented to operate one or more central processing units (CPUs) in a device or a secure multimedia card. Also, the " . . . unit" may include at least one processor.

Terms used in the present disclosure are used only to describe certain embodiments, and may not be intended to limit the scope of other embodiments. An expression used in the singular may encompass the expression in the plural, unless it has a clearly different meaning in the context. Terms used herein, including technical or scientific terms, may have the same meaning as commonly understood by one of ordinary skill in the art described in the present disclosure. Among the terms used in the present disclosure, terms defined in a commonly used dictionary may be interpreted with the same or similar meaning as the meaning in the context of the related art, and unless defined apparently in the present disclosure, the terms are not ideally or excessively construed as having formal meaning. According to circumstances, even terms defined in the present disclosure shall not be interpreted as excluding embodiments of the present disclosure.

In various embodiments of the present disclosure described below, a hardware-based approach is described as an example. However, because various embodiments of the present disclosure include technology using both hardware and software, various embodiments of the present disclosure do not exclude a software-based approach.

The present disclosure relates to a method and apparatus for supporting various services in a wireless communication system. In detail, the present disclosure describes a technique for supporting various services by supporting user equipment mobility in a wireless communication system.

Hereinafter, terms indicating a connection node, terms indicating a network entity or a network function (NF), terms indicating messages, terms indicating an interface between network entities, and terms indicating various pieces of identification information used herein are exemplified for convenience of description. Accordingly, the present disclosure is not limited to the terms to be described below, but other terms indicating objects having equal technical meanings may be used. For example, a function of a network slice selection function (NSSF), which is an NF in an embodiment of the present disclosure, may be performed by a network repository function (NRF), which is another NF.

Hereinafter, some terms and names defined in the 3rd generation partnership project long term evolution (3GPP LTE) standard or 5G standards may be used in the present disclosure for convenience of description. However, the present disclosure is not limited to these terms and names, and may be equally applied to wireless communication systems conforming to other standards. In particular, the present disclosure may be applied to a 3GPP New Radio (NR, 5th Generation mobile communication standards). In the present disclosure, an eNB may be interchangeably used with a gNB for convenience of description. That is, a base station described as an eNB may refer to a gNB. Alternatively, a base station described as a gNB may refer to an eNB. Alternatively, a node described as a base station may refer to eNB or gNB. Also, the term "user equipment" may refer to other wireless communication devices as well as mobile phones, NB-IoT devices, and sensors.

Hereinafter, a base station is an entity that assigns resources of a user equipment, and may be at least one of a gNode B, an eNode B, a base station (BS), a wireless access unit, a base station controller, or a node on a network. Examples of a user equipment may include a user equipment (UE), a mobile station (MS), a cellular phone, a smartphone, a computer, or a multimedia system capable of performing a communication function. However, the present disclosure is not limited to the above examples.

FIG. 1 illustrates a wireless communication system according to an embodiment of the present disclosure.

Referring to FIG. 1, in the wireless communication system, as some of nodes using a wireless channel, a base station (radio access node (RAN)) 110 and a user equipment (UE) 120 are shown as examples. In FIG. 1, one base station 110 and one user equipment 120 are illustrated. However, other base stations identical or similar to the base station 110 may also be further included. Also, FIG. 1 illustrates only a case where only one user equipment 120 communicates within one base station 110. However, it is obvious that a plurality of user equipments may communicate within one base station 110 in reality.

According to an embodiment of the present disclosure, the base station 110 may be a network infrastructure providing radio access to the user equipment 120. The base station 110 has coverage defined as a certain geographical region based on a range for transmitting a signal. The base station 110 may be referred to by, in addition to the base station, an access point (AP), an evolved node B (eNB), a 5G node, a wireless point, a transmission/reception point (TRP), or another term having an equivalent technical meaning. However, the present disclosure is not limited to the above example.

According to an embodiment of the present disclosure, the user equipment 120 is a device used by a user, and may communicate with the base station 110 through a wireless channel. In some cases, the user equipment 120 may be operated without the involvement of a user. For example, the user equipment 120 is a device that performs machine type communication (MTC) and may not be carried by the user. The user equipment 120 illustrated in FIG. 1 may include at least one portable user device and may include at least one MTC device. The user equipment 120 of FIG. 1 may be referred to as a term such as a 'terminal', 'mobile station', 'subscriber station', 'remote terminal', 'wireless terminal', or 'user device' or another term having an equivalent technical meaning.

According to an embodiment of the present disclosure, an AMF 131 may be a network entity that manages wireless network access and mobility for the user equipment 120. An SMF 132 may be a network entity that manages a connection of a packet data network for providing packet data to the user equipment 120. A connection between the user equipment 120 and the SMF 132 may be a packet data unit (PDU) session.

According to an embodiment of the present disclosure, a User Plane Function (hereinafter, referred to as UPF) 133 may be a gateway that transmits packets transmitted and received by the user equipment 120 or a network entity that functions as a gateway. The UPF 133 may be connected to a data network (DN) 140 connected via the Internet to provide a path for data transmission/reception between the user equipment 120 and the DN 140. Accordingly, the UPF 133 may route, to an Internet data network, data to be transmitted via the Internet among packets transmitted by the user equipment 120.

According to an embodiment of the present disclosure, a Network slice selection function (NSSF) 134 may be a network entity that performs a network selection operation described in the present disclosure, for example, an operation for selecting a network slice. An operation of the NSSF entity 134 will be described in detail with reference to the drawings to be described later.

According to an embodiment of the present disclosure, an Authentication Server Function (AUSF) entity 151 may be a network entity that provides a service for subscriber authentication processing.

According to an embodiment of the present disclosure, a Network Exposure Function (NEF) 152 may be a network entity that is able to access information for managing the user equipment 120 in a 5G network, and may subscribe to a Mobility Management event of a corresponding user equipment, subscribe to a Session Management event of a corresponding user equipment, make a request for session-related information, set charging information for a corresponding user equipment, make a request to change a PDU session policy for a corresponding user equipment, and transmit small data about a corresponding user equipment.

According to an embodiment of the present disclosure, a Network Repository Function (NRF) 153 may be an NF (network entity) that stores state information of NFs, and has a function of processing a request to find an NF accessible by other NFs.

According to an embodiment of the present disclosure, a Policy and Charging Function (PCF) 154 may be a network entity that applies a mobile communication operator's service policy, charging policy, and PDU session policy to the user equipment 120.

According to an embodiment of the present disclosure, a Unified Data Management (UDM) 155 may be a network entity that stores information about subscribers and/or the user equipment 120.

According to an embodiment of the present disclosure, an Application Function (AF) 156 may be an NF (network entity) having a function of providing a service to users by interworking with a mobile communication network.

According to an embodiment of the present disclosure, a Service Communication Proxy (SCP) 157 may be an NF (network entity) that provides functions such as NF discovery for communication between NFs, and message transfer between NFs. The SCP 157 may operate in an integrated form with the NRF 153 according to the operator's selection; in this case, the SCP 157 may include the functions of the Network Repository Function (NRF) 153, or, conversely, the NRF 153 may include the functions of SCP 157.

Hereinafter, for convenience of descriptions, objects for exchanging information for access control and state management will be collectively described as an NF. An NF may be at least one of, for example, an Access and Mobility Management Function (hereinafter referred to as AMF) entity, a Session Management Function (hereinafter referred to as SMF) entity, or a Network Slice Selection Function (NSSF) entity. However, the embodiments of the present disclosure may be equally applied even when an NF is actually implemented as an instance (each as an AMF Instance, an SMF Instance, an NSSF Instance, etc.). Also, according to an embodiment of the present disclosure, an NF may be referred to as an entity.

In the present disclosure, NFs may be merged with each other, or one NF may include the functions of another NF. For example, an NRF may include the functions of an NSSF. In addition, in describing the embodiments of the present disclosure, a certain operation is described by referring to one NF, but the gist of the present disclosure may also be applied such that another NF includes the function and operates.

In the present disclosure, an instance may refer to a certain NF implemented in the form of software code. An instance may execute a function of a given NF by being allocated with physical and/or logical resources from a computing system to perform a function of the NF in a physical computing system, for example, a certain computing system existing on a core network. Thus, the AMF Instance, the SMF Instance, or the NSSF Instance may be each allocated with physical and/or logical resources for AMF, SMF, and NSSF operations from a certain computing system existing on the core network, and use the resources. As a result, a physical AMF, SMF, or NSSF entity and an AMF Instance, an SMF Instance, or an NSSF Instance which are respectively allocated with physical and/or logical resources for AMF, SMF, and NSSF operations from a certain computing system existing on the core network may perform the same operation.

As a result, a physical AMF, SMF, or NSSF entity and an AMF Instance, an SMF Instance, or an NSSF Instance which are respectively allocated with physical and/or logical resources for AMF, SMF, and NSSF operations from a certain computing system existing on the core network may perform the same operation. Thus, in an embodiment of the present disclosure, details described with respect to an NF (AMF, SMF, UPF, NSSF, NRF, SCP, etc.) may be replaced with those with respect to an NF instance, or conversely, details described with respect to an NF instance may be replaced with those with respect to an NF and applied. Similarly, in an embodiment of the present disclosure, details described with respect to a network slice (NW slice) may be replaced with those with respect to an NW slice instance, or conversely, details described with respect to an NW slice instance may be replaced with those with respect to an NW slice and applied. Also, in an embodiment of the present disclosure, a subscriber and a user equipment may be used interchangeably as having same meaning.

Figure 2:
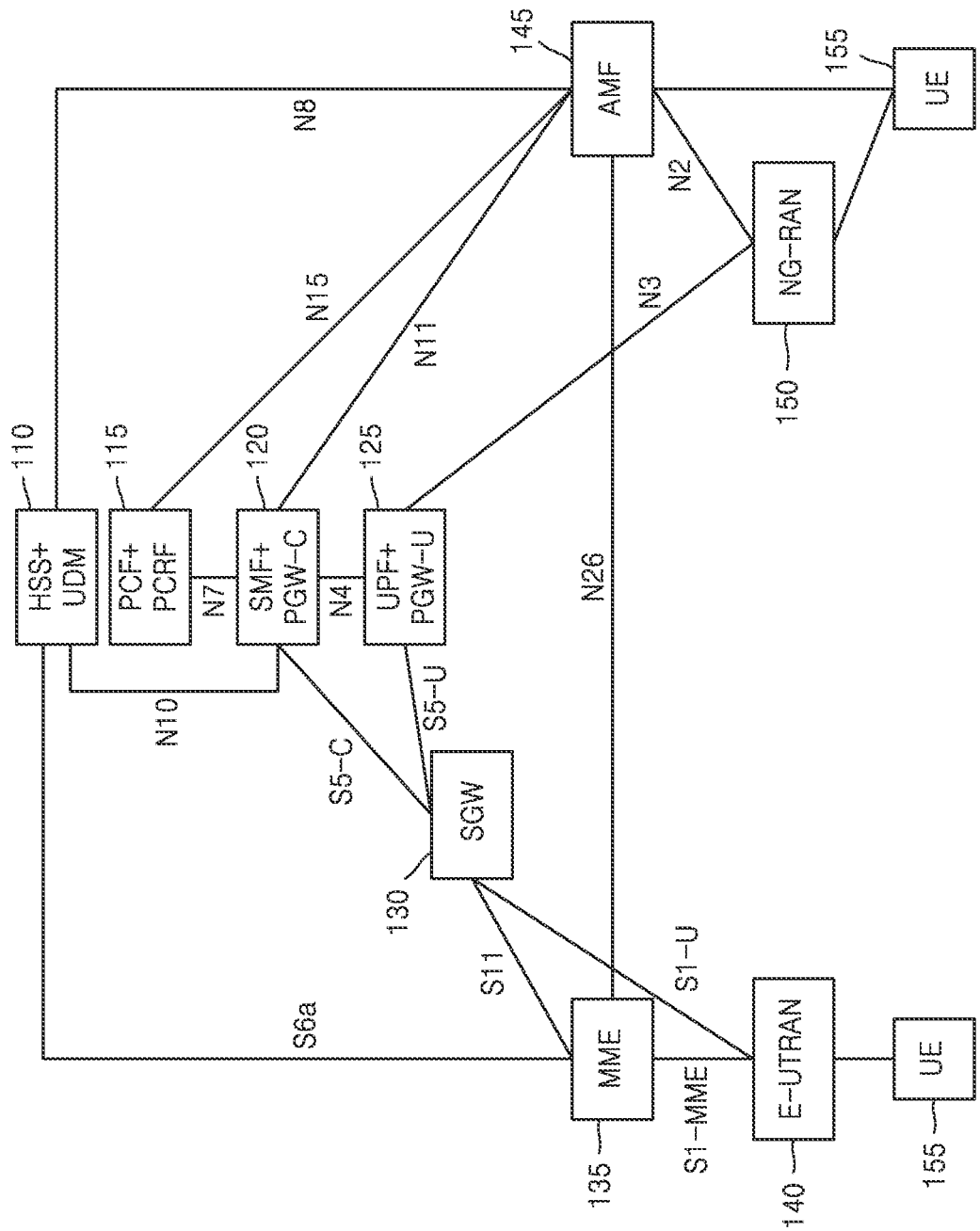
FIG. 2 illustrates an interworking structure between 5GS and EPS in a non-roaming situation, according to an embodiment of the present disclosure.

FIG. 2 illustrates an interworking structure between a 5G System (5GS) and an Evolved Packet System (EPS) in a non-roaming situation according to an embodiment of the present disclosure.

The 5GS may be composed of a New Radio (NR) base station 150, an AMF 145, an SMF 120, a UPF 125, a PCF 115, and a UDM 110. The EPS may be composed of an E-UTRA base station 140, an MME 135, a SGW 130, a PGW-U 125, a PGW-C 120, a PCRF 115, and a HSS 110. The EPS may also be composed of fewer or more entities than those illustrated in FIG. 2.

According to an embodiment of the present disclosure, the UDM 110 of the 5GS and the HSS 110 of the EPS may be configured as a single combo node. The SMF 120 of the 5GS and the PGW-C 120 of the EPS may be configured as a single combo node. Also, according to an embodiment of the present disclosure, a node of the UDM+HSS 110 may store subscriber information of a user equipment. The UPF 125 of the 5GS and the PGW-U 125 of the EPS may be configured as a single combo node. A user equipment 155 may use an EPS network service by accessing the MME 135 of the EPS through the E-UTRA base station 140. However, the present disclosure is not limited to the above example.

In addition, the user equipment 155 may use a 5GS network service by accessing the AMF 145 of the 5GS through the NR base station 150. While FIG. 2 shows an interworking structure of a non-roaming situation, other embodiments of the present disclosure are applicable not only to the non-roaming situation, and may also be applied to a roaming situation (local breakout or home-routed).

When a 5G-supporting user equipment can selectively access 5GS and EPS, depending on a network situation, the user equipment may first access the 5GS and then move to the EPS (5GS to EPS interworking) or, conversely, may access the EPS first and then move to the 5GS (EPS to 5GS interworking). When the user equipment first accesses the EPS and then moves to the 5GS, a PDN connection established in the EPS may be converted into a PDU session of the 5GS, and the user equipment needs to enter information of a network (NW) slice (NW slice identifier) when requesting to create a PDU session of the 5GS. As a network cannot be configured or selected with NW slices in the EPS, a method of transmitting in advance an NW slice identifier that can be used in the 5GS may be required during access to EPS to support such mobility of a user equipment to the 5GS.

Depending on the configuration of a 5GS network, two or more Data Network Names (DNNs) (a concept equivalent to or similar to Access Point Name (APN)) may be mapped to one NW slice, or conversely, one DNN may be supported in two or more NW slices. In this case, when an NW slice identifier transmitted from the EPS to the user equipment does not match an NW slice identifier to be used in the 5GS network, or is configured differently from mapping with DNN, transition to a PDU session may fail or service continuity may not be guaranteed when the user equipment moves from the EPS to the 5GS. Thus, a method for solving the problems described above may be required.

Figure 3:
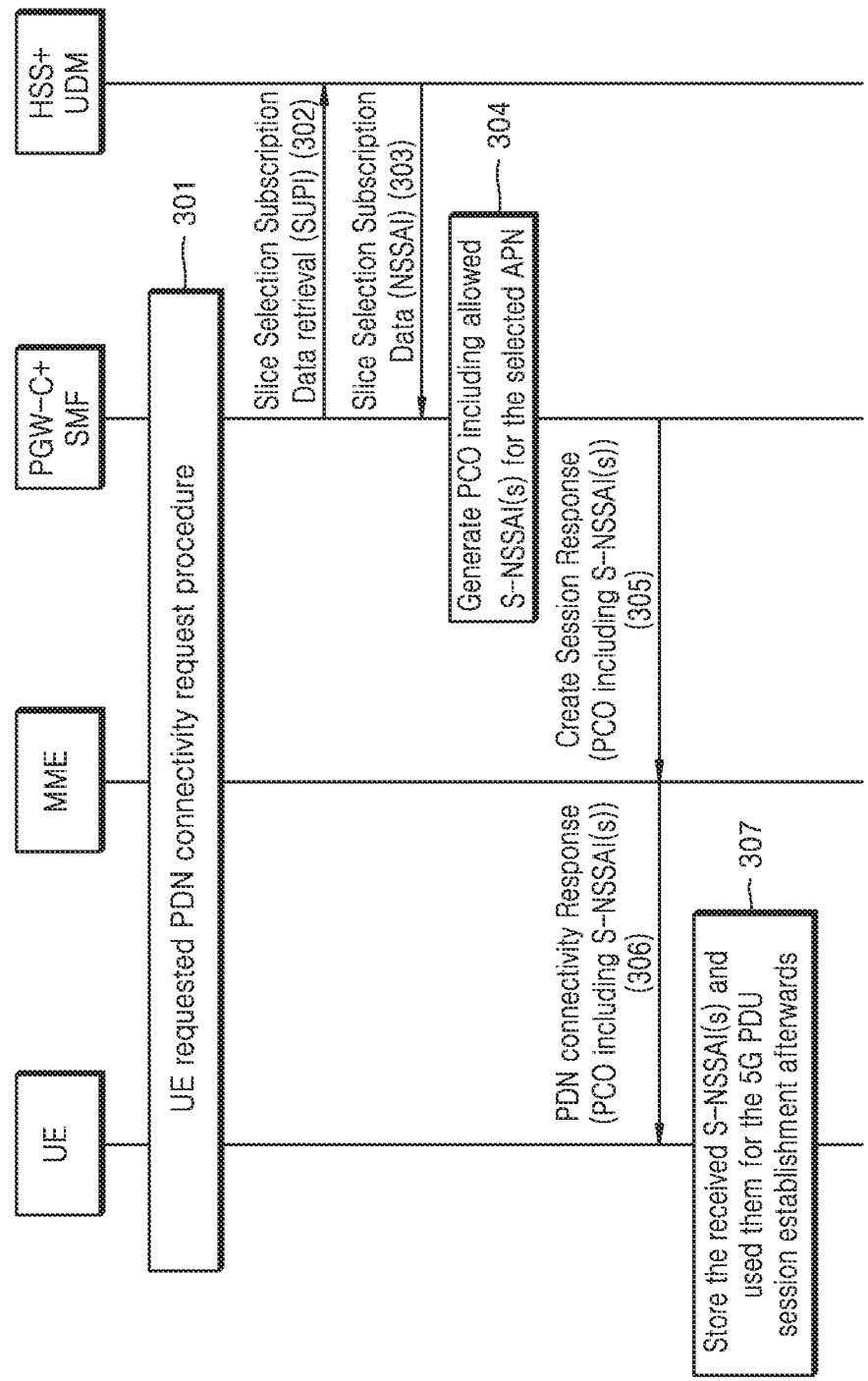
FIG. 3 illustrates a method of transmitting NW slice information in a 5G-4G interworking environment, according to an embodiment of the present disclosure.

FIG. 3 illustrates a method of transmitting NW slice information in a 5G-4G interworking environment, according to an embodiment of the present disclosure.

In operation 301, a procedure for establishing a PDN connection in the EPS (e.g., 4G network) may be executed at the request of a user equipment. Operation 301 may be merged with an Attach requested by the user equipment. In operation 301, the user equipment may include, in a request message, an APN, with which a PDN connection is to be established.

According to an embodiment of the present disclosure, a request sent by the user equipment may include information indicating whether two or more pieces of S-NSSAI can be received through a Protocol Configuration Option (PCO) or an extended PCO (ePCO). The information may be indicated as a capability of a NAS message sent by the user equipment or a separate indicator, or may be included in a portion of a PCO (protocol options, etc.). The present disclosure is not limited to the above example, and a method of transmitting information indicating whether two or more pieces of S-NSSAI can be received is not limited.

According to an embodiment of the present disclosure, an NAS level-PDN connection establishment request message transmitted by the user equipment is transmitted to a Mobility Management Entity (MME) through a base station, and the MME may select, according to a request from the user equipment or subscription information of the user equipment, a Serving GW (SGW) or a PDN GW (PGW), for which a PDN connection is to be established. The MME may transmit a request message for creating a session (Create Session Request) to the SGW, and the message for creating a session may include an identifier of a UE/subscriber which is a target of a PDN connection (International Mobile Subscriber Identity (IMSI)), APN, PCO. The SGW may transmit a request message for creating a session (Create Session Request) to a PGW-C, and the message for creating a session may include an identifier (IMSI), APN, PCO of the UE/subscriber which is a target of a PDN connection.

In operation 302, a PDN Gateway Control Plane (PGW-C) may support interworking with the 5GS, and may include a function of SMF. Instead of PGW-C, a PGW (or a combo node of PGW-C and PGW-U) may perform the above function. When the Create Session Request received in operation 301 is targeted at 5GS Interworking (this can be determined based on a local setting of the PGW-C or information received through the MME or SGW), the PGW-C may transmit a request for receiving NW slice information of the 5GS about a corresponding subscriber, a requested APN, to an NF storing subscriber information. The NF may be one of UDM, HSS, or UDR, and a service requested by the PGW-C may be a Slice Selection Subscription Data Retrieval request. The Slice Selection Subscription Data Retrieval request includes an identifier of a target subscriber (SUPI, a subscriber ID received in operation 301 may be used), and an APN for a current session may be additionally transmitted together here.

In operation 303, the NF storing the subscriber information may transmit slice information about the subscriber in response to the request from the PGW-C. The NF may be one of UDM, HSS, or UDR, and a response service may be a Slice Selection Subscription Data Retrieval response. The response message may include subscribed NSSAI (one or more pieces of subscribed S-NSSAI) for the subscriber.

In operation 304, the PGW-C may select an identifier (i.e., S-NSSAI) of an NW Slice to be notified to the user equipment by using the NSSAI received in the response message. When the NSSAI of the response message includes only one S-NSSAI, this may be notified to the user equipment. When the NSSAI of the response message includes two or more pieces of S-NSSAI, all of them may be notified to the user equipment.

When the PGW-C supports only some pieces of S-NSSAI included in the NSSAI of the response message, only those pieces of S-NSSAI supported by the PGW-C may be notified to the user equipment. When only some pieces of S-NSSAI included in the NSSAI of the response message can be interworked with a current target APN, only those pieces of S-NSSAI mapped with the APN may be notified to the user equipment. The S-NSSAI notified to the user equipment may use a Protocol Configuration Option (PCO) or an ePCO. That is, the PGW-C may create a PCO including at least one S-NSSAI to be notified to the user equipment. When there are two or more pieces of S-NSSAI that may be notified to the user equipment, but two or more pieces of S-NSSAI cannot be received, in consideration of information which is received in operation 301 and is about whether or not a corresponding function is supported by the user equipment, only one S-NSSAI may be selected and transmitted.

In operation 305, the PCO may be included in a Create Session Response message responded to the SGW or the MME, and transmitted.

In operation 306, the MME may include, in an NAS response message transmitted to the user equipment, a PCO containing slice information (one or more pieces of S-NSSAI) received from the PGW-C or the SGW.

In operation 307, the user equipment stores the NSSAI received from the MME as information (context) of a corresponding PDN connection. The stored NSSAI may be used when the user equipment determines a Requested NSSAI during a registration process when moving to the 5GS, or when it is necessary to move the corresponding PDN connection to the 5GS.

According to an embodiment of the present disclosure, NSSAI included in a registration request message transmitted after the user equipment has moved to the 5GS may be a union of pieces of NSSAI received for all of created PDN connections. When two or more pieces of S-NSSAI are stored for a corresponding PDN connection, the user equipment may apply a method of selecting S-NSSAI when creating a PDU session in the 5GS, and include the stored S-NSSAI in a PDU session request message to be transmitted to the 5GS and transmit the PDU session request message. In addition, according to an embodiment of the present disclosure, only those pieces of S-NSSAI overlapping with the S-NSSAI stored for the corresponding PDN connection among Allowed NSSAI included in a Registration Accept message received from an AMF when moving to the 5GS may be included in the PDU session request message and transmitted.

Figure 4:
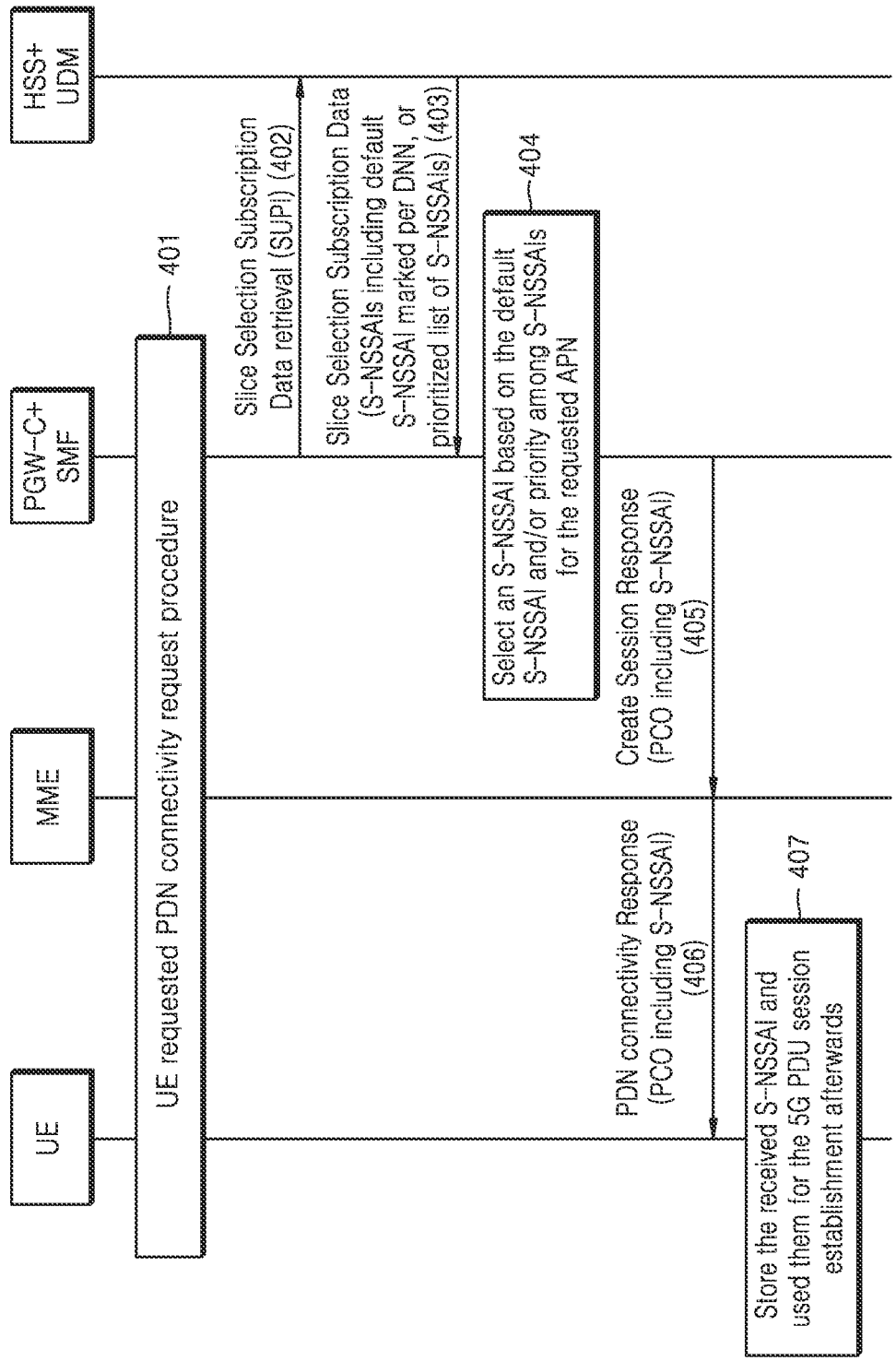
FIG. 4 illustrates a method of transmitting NW slice information in a 5G-4G interworking environment, according to an embodiment of the present disclosure.

FIG. 4 illustrates a method of transmitting NW slice information in a 5G-4G interworking environment, according to an embodiment of the present disclosure.

In operation 401, a procedure for establishing a PDN connection in the EPS (e.g., 4G network) may be executed at the request of a user equipment. Operation 401 may be merged with an Attach requested by the user equipment. In operation 401, the user equipment may include, in a request message, an APN, with which a PDN connection is to be established.

According to an embodiment of the present disclosure, a request sent by the user equipment may include information indicating whether two or more pieces of S-NSSAI can be received through a Protocol Configuration Option (PCO) or an ePCO. The information may be indicated as a capability of a NAS message sent by the user equipment or a separate indicator, or may be included in a portion of a PCO (protocol options, etc.). The present disclosure is not limited to the above example, and a method of transmitting information indicating whether two or more pieces of S-NSSAI may be received is not limited.

According to an embodiment of the present disclosure, a NAS level-PDN connection establishment request message transmitted by the user equipment is transmitted to the MME via a base station, and the MME may select a SGW or a PGW to establish a PDN connection based on a request from the user equipment and subscription information of the user equipment. The MME may transmit, to the SGW, a request message for creating a session (Create Session Request), and the message for creating a session may include an identifier (IMSI), APN, PCO of the UE/subscriber a target of a PDN connection. The SGW may transmit a request message for creating a session (Create Session Request) to a PGW-C, and the message for creating a session may include an identifier (IMSI), APN, PCO of a UE/subscriber which is a target of a PDN connection.

In operation 402, the PGW-C may support interworking with the 5GS, and may include a function of an SMF. When a session creation request received in operation 401 is a target of 5GS Interworking (this can be determined based on a local setting of the PGW-C or information received through the MME or SGW), the PGW-C may transmit a request for receiving NW slice information of the 5GS about a corresponding subscriber, a requested APN, to an NF storing subscriber information. The NF may be one of UDM, HSS, UDR, and a service requested by the PGW-C may be a Slice Selection Subscription Data Retrieval request. The Slice Selection Subscription Data Retrieval request includes an identifier of a target subscriber (SUPI, the subscriber ID received in operation 401 may be used), and an APN for a current session may be additionally transmitted together here.

In operation 403, the NF storing the subscriber information may transmit slice information about the subscriber in response to the request from the PGW-C. The NF may be one of UDM, HSS, UDR, and a response service may be a Slice Selection Subscription Data Retrieval response. The response message may include subscribed NSSAI (one or more pieces of subscribed S-NSSAI) for the subscriber.

When the subscribed NSSAI for the subscriber includes two or more pieces of S-NSSAI, the NF may additionally include information for determining a default S-NSSAI for the corresponding subscriber, in the response message. When an APN is included in the request received in operation 402, the request may include information that may be used to determine an S-NSSAI to be applied default for the corresponding APN. Alternatively, the NF may determine priorities among pieces of subscribed S-NSSAI with respect to the subscriber in the response message and configure information that allows determining of a priority of each S-NSSAI to respond. The priorities may explicitly inform respective priority values of the S-NSSAI or a list including a set order of the priorities may be included in the response message. However, the present disclosure is not limited to the above example.

In operation 404, the PGW-C may select an identifier (i.e., S-NSSAI) of an NW Slice to be notified to the user equipment by using the NSSAI received in the response message. When the NSSAI of the response message includes only one S-NSSAI, this may be notified to the user equipment. When the NSSAI of the response message includes two or more pieces of S-NSSAI and a default S-NSSAI is specified in the response, the PGW-C may preferentially select the same. When the NSSAI of the response message includes two or more pieces of S-NSSAI and it is possible to determine priorities among the pieces of S-NSSAI based on the response, the PGW-C may preferentially select S-NSSAI having a higher priority. The PGW-C may notify the user equipment of the selected one piece of S-NSSAI, and the S-NSSAI notified to the user equipment may use a PCO or an ePCO. That is, the PGW-C may create a PCO including at least one piece of S-NSSAI to be notified to the user equipment. When there are two or more pieces of S-NSSAI that may be notified to the user equipment, but two or more pieces of S-NSSAI cannot be received, in consideration of information which is received in operation 401 and is about whether or not a corresponding function is supported by the user equipment, only one S-NSSAI may be selected and transmitted.

In operation 405, the PCO may be included in a Create Session Response message responded to the SGW and the MME, and transmitted.

In operation 406, the MME may include, in an NAS response message transmitted to the user equipment, a PCO containing slice information (one or more pieces of S-NSSAI) received from the PGW-C or the SGW.

In operation 407, the user equipment stores the NSSAI received from the MME as information (context) of the corresponding PDN connection. The stored NSSAI may be used to determine Requested NSSAI during a registration process when the user equipment moves to the 5GS, or when it is necessary to move the corresponding PDN connection to the 5GS.

According to an embodiment of the present disclosure, NSSAI included in a registration request message transmitted after the user equipment has moved to the 5GS may be a union of pieces of NSSAI received for all of created PDN connections. When two or more pieces of S-NSSAI are stored for a corresponding PDN connection, the user equipment may apply a method of selecting S-NSSAI when creating a PDU session in the 5GS and includes the stored S-NSSAI in a PDU session request message to be transmitted to 5GS and transmit the same. In addition, according to an embodiment of the present disclosure, only those pieces of S-NSSAI overlapping with the S-NSSAI stored for the corresponding PDN connection among Allowed NSSAI included in a Registration Accept message received from an AMF when moving to the 5GS may be included in the PDU session request message and transmitted.

Figure 5:
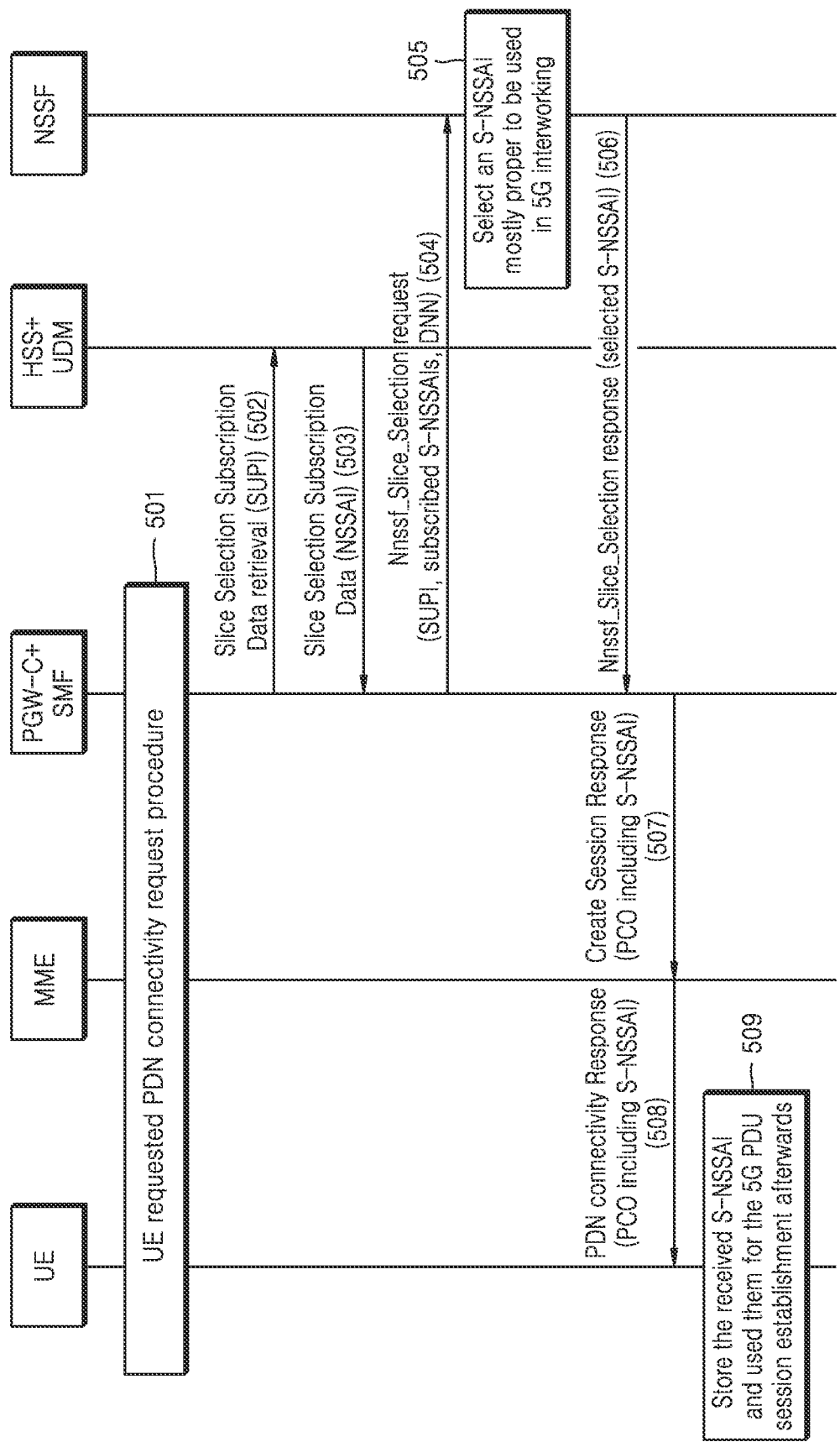
FIG. 5 illustrates a method of transmitting NW slice information in a 5G-4G interworking environment, according to an embodiment of the present disclosure.

FIG. 5 illustrates a method of transmitting NW slice information in a 5G-4G interworking environment, according to an embodiment of the present disclosure.

In operation 501, a procedure for establishing a PDN connection in the EPS (e.g., 4G network) may be executed at the request of a user equipment. Operation 501 may be merged with an Attach requested by the user equipment. In operation 501, the user equipment may include, in a request message, an APN with which the PDN connection is to be established.

According to an embodiment of the present disclosure, the request sent by the user equipment may include information indicating whether two or more pieces of S-NSSAI can be received through a Protocol Configuration Option (PCO, or ePCO). The information may be indicated as a capability of a NAS message sent by the user equipment or a separate indicator, or may be included in a portion of a PCO (protocol options, etc.). The present disclosure is not limited to the above example, and a method of transmitting information indicating whether two or more pieces of S-NSSAI can be received is not limited.

According to an embodiment of the present disclosure, a NAS level-PDN connection establishment request message transmitted by the user equipment is transmitted to the MME via a base station, and the MME may select a SGW or a PGW to establish a PDN connection based on a request from the user equipment and subscription information of the user equipment. The MME may transmit, to the SGW, a request message for creating a session (Create Session Request), and the message for creating a session may include an identifier (IMSI), APN, PCO of the UE/subscriber a target of a PDN connection. The SGW may transmit a request message for creating a session (Create Session Request) to a PGW-C, and the message for creating a session may include an identifier (IMSI), APN, PCO of the UE/subscriber which is a target of a PDN connection.

In operation 502, the PGW-C may support interworking with the 5GS, and may include a function of an SMF. When the user equipment has included a PDU session ID in a PCO included in the received Create Session Request received in operation 501, the PGW-C may determine that the PDN connection is a target of interworking, and when the Create Session Request received in operation 501 is targeted at 5GS interworking, the PGW-C may transmit a request for receiving NW slice information of the 5GS about the corresponding subscriber, requested APN, to an NF storing subscriber information. The NF may be one of UDM, HSS, UDR, and a service requested by the PGW-C may be a Slice Selection Subscription Data Retrieval request. The Slice Selection Subscription Data Retrieval request includes an identifier of a target subscriber (SUPI, the subscriber ID received in operation 501 may be used), and an APN for a current session may be additionally transmitted together here.

In operation 503, the NF storing the subscriber information may transmit slice information about the subscriber in response to the request from the PGW-C. The NF may be one of UDM, HSS, UDR, and a response service may be a Slice Selection Subscription Data Retrieval response. The response message may include subscribed NSSAI (one or more pieces of subscribed S-NSSAI) for the subscriber.

When the subscribed NSSAI for the subscriber includes two or more pieces of S-NSSAI, the NF may additionally include information for determining default S-NSSAI for the corresponding subscriber in the response message. When the request received in operation 502 includes an APN, the request may include information that may be used to determine Single Network Slice Selection Assistance Information (S-NSSAI) to be applied as default with respect to the APN. Alternatively, the NF may determine priorities among pieces of subscribed S-NSSAI with respect to the subscriber in the response message and configure information that allows determining of a priority of each S-NSSAI to respond. The priorities may explicitly inform respective priority values of the S-NSSAI or a list including a set order of the priorities may be included in the response message. However, the present disclosure is not limited to the above example.

In operation 504, when the Subscribed NSSAI received in operation 503 includes two or more pieces of S-NSSAI, or when more accurate slice selection is required, the PGW-C may provide slice-related information or request a service from an NF that provides a slice selection function. That is, the PGW-C may request a service from an NF such as a Network Slice Selection Function (NSSF). The example is not limited thereto, and another PGW-C may request a service from an NF other than the NSSF.

According to an embodiment of the present disclosure, a service request message sent by the PGW-C(SMF) may include an identifier of a subscriber (Subscription Permanent Identifier (SUPI) or IMSI), the Subscribed NSSAI received in operation 503, and an APN (DNN) received from the user equipment. In addition, the service request message may include information explicitly indicating that slice selection or slice information request is a session establishment process in consideration of slices in 5G-4G interworking or EPS.

In operation 505, having received the slice information from the PGW-C(SMF), the NF may select S-NSSAI in consideration of the information included in the request (subscriber identifier, subscribed NSSAI, APN, etc.) and the fact that the PDN connection can be moved from the current EPS to the 5GS in the future.

In operation 506, the PGW-C (or SMF or PGW-C, SMF combo node) may receive a response message from the NF. The NF may select only one S-NSSAI, or may select two or more pieces of S-NSSAI. When the NF selects two or more pieces of S-NSSAI, information for determining which S-NSSAI is the default S-NSSAI may be additionally included. Alternatively, when two or more pieces of S-NSSAI are selected, the NF may determine priorities among pieces of subscribed S-NSSAI with respect to the subscriber in the response message and configure information that allows determining of a priority of each S-NSSAI to respond. The priorities may explicitly inform respective priority values of the S-NSSAI or a list including a set order of the priorities may be included in the response message.

In operation 507, the PGW-C may notify the user equipment of the selected S-NSSAI. When the NSSAI of the response message includes only one S-NSSAI, this may be notified to the user equipment. When the NSSAI of the response message includes two or more pieces of S-NSSAI and default S-NSSAI is specified in the response, the PGW-C may preferentially select the same. Alternatively, when the NSSAI of the response message includes two or more pieces of S-NSSAI and it is possible to determine priorities among the pieces of S-NSSAI based on the response, the PGW-C may preferentially select S-NSSAI having a higher priority.

The PGW-C may notify the user equipment of the selected one S-NSSAI, and the S-NSSAI notified to the user equipment may use a PCO or an ePCO. That is, the PGW-C may create a PCO including at least one S-NSSAI to be notified to the user equipment. When there are two or more pieces of S-NSSAI that may be notified to the user equipment, but two or more pieces of S-NSSAI cannot be received, in consideration of information which is received in operation 501 and is about whether or not a corresponding function is supported by the user equipment, only one S-NSSAI may be selected and transmitted. The PCO may be included in the Create Session Response message responded to the SGW and the MME, and transmitted.

In operation 508, the MME may include, in an NAS response message transmitted to the user equipment, a PCO containing the slice information (one or more pieces of S-NSSAI) received from the PGW-C or the SGW.

In operation 509, the user equipment stores the NSSAI received from the MME as information (context) of the corresponding PDN connection. The stored NSSAI may be used to determine Requested NSSAI during a registration process when the user equipment moves to the 5GS, or when it is necessary to move the corresponding PDN connection to the 5GS.

According to an embodiment of the present disclosure, NSSAI included in a registration request message transmitted after the user equipment has moved to the 5GS may be a union of pieces of NSSAI received for all of created PDN connections. When two or more pieces of S-NSSAI are stored for a corresponding PDN connection, the user equipment may apply a method of selecting S-NSSAI when creating a PDU session in the 5GS and include the stored S-NSSAI in a PDU session request message to be transmitted to 5GS and transmit the same. In addition, according to an embodiment of the present disclosure, only those pieces of S-NSSAI overlapping with the S-NSSAI stored for the corresponding PDN connection among Allowed NSSAI included in a Registration Accept message received from an AMF when moving to the 5GS may be included in the PDU session request message and transmitted.

Figure 6:
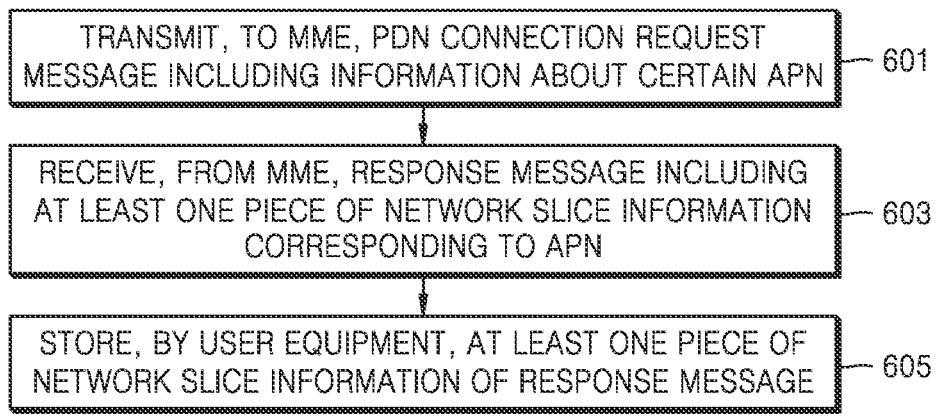
FIG. 6 is a flowchart of a communication method performed by a user equipment, according to an embodiment.

FIG. 6 is a flowchart of a communication method performed by a user equipment, according to an embodiment of the present disclosure.

In operation 601, the user equipment may transmit, to the MME, a PDN connection request message including information about a certain APN. The user equipment supports 5G capability (N1 Capability), and when a corresponding PDN connection requires 5G interworking, the user equipment may generate a PDU Session ID and include the same in a PCO or an ePCO included in the PDN connection request.

According to an embodiment of the present disclosure, a process of establishing a PDN connection may be performed together with an Attach operation. In addition, the APN in the PDN connection request message may be an APN, with which the user equipment intends to establish a connection.

Also, according to an embodiment of the present disclosure, the user equipment may transmit, to the MME, information indicating whether the user equipment is able to receive two or more pieces of S-NSSAI through the PCO. The information indicating whether the user equipment is able to receive two or more pieces of S-NSSAI through the PCO may be indicated as a capability of a transmitted NAS message or a separate indicator, or may be included in a portion of a PCO (protocol options, etc.).

In operation 603, the user equipment may receive, from the MME, a response message including at least one piece of network slice information corresponding to the APN.

According to an embodiment of the present disclosure, the user equipment may include slice information (at least one S-NSSAI) received from the PGW (or SGW) in the NAS response message received from the MME, and the slice information may be included in the PCO.

In operation 605, the user equipment may store at least one piece of network slice information of the response message.

According to an embodiment of the present disclosure, the user equipment may store the NSSAI received from the MME as information (context) of the corresponding PDN connection. When the user equipment moves from the EPS to the 5GS, the user equipment may transmit a PDU session request message to be transmitted to the 5GS, by including at least one of the stored pieces of S-NSSAI in the PDU Session Request message.

According to an embodiment of the present disclosure, when the user equipment stores a plurality of pieces of S-NSSAI, all of the plurality of pieces of S-NSSAI may be transmitted through a PDU Session request message, or may select at least one of the plurality of pieces of S-NSSAI and transmit the same via the PDU Session request message. For example, the user equipment may include, in the PDU Session request message, only S-NSSAI corresponding to Allowed NSSAI included in a Registration Accept message among the stored plurality of pieces of S-NSSAI, and transmit the same.

Figure 7:
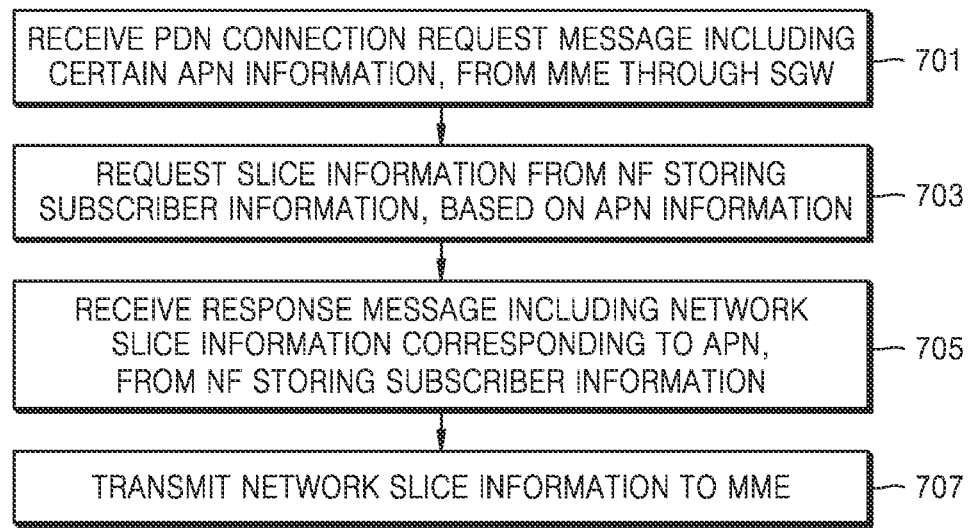
FIG. 7 is a flowchart of a communication method of a packet data network (PDN)-gateway (PGW), according to an embodiment of the present disclosure.

FIG. 7 is a flowchart of a communication method of a PGW, according to an embodiment of the present disclosure.

In operation 701, the PGW may receive a PDN connection request message including certain APN information from an MME through a SGW. When a PDU Session ID generated by a user equipment is included in a PCO or an ePCO included in the received request message, the PGW may determine that a corresponding PDN connection may be a target of 5G Interworking.

According to an embodiment of the present disclosure, a process of establishing a PDN connection may be performed together with an Attach operation. In addition, the APN in the PDN connection request message may be an APN, with which the user equipment intends to establish a connection.

Also, according to an embodiment of the present disclosure, the PGW may receive information indicating whether the user equipment is able to receive two or more pieces of S-NSSAI through the PCO. The information indicating whether the user equipment is able to receive two or more pieces of S-NSSAI through the PCO may be indicated as a capability of a transmitted NAS message or a separate indicator, or may be included in a portion of a PCO (protocol options, etc.). The PGW may also not receive the information indicating whether the user equipment is able to receive two or more pieces of S-NSSAI through the PCO, and only the MME may receive the information.

In operation 703, the PGW may request slice information from an NF storing subscriber information, based on the APN information.

According to an embodiment of the present disclosure, the PGW may support interworking with the 5GS, and include a function of an SMF. The PGW may transmit, to the NF storing the subscriber information, a request for receiving NW slice information of the 5GS corresponding to the subscriber of the user equipment and the requested APN.

According to an embodiment of the present disclosure, the NF storing the subscriber information may be one of UDM, HSS, UDR, and a service requested by the PGW may be a Slice Selection Subscription Data Retrieval request. The Slice Selection Subscription Data Retrieval request includes an identifier of a target subscriber (SUPI, the subscriber ID received in operation 501 may be used), and an APN for a current session may be additionally transmitted together here.

In operation 705, the PGW may receive a response message including network slice information corresponding to the APN, from the NF storing the subscriber information.

According to an embodiment of the present disclosure, the response message may be a Slice Selection Subscription Data Retrieval response. The response message may include subscribed NSSAI (one or more pieces of subscribed S-NSSAI) for the subscriber.

According to an embodiment of the present disclosure, when a plurality of pieces of network slice identification information (e.g., a plurality of S-NSSAI) are included in the response message, the PGW may select at least one S-NSSAI, and notify the user equipment of the selected at least one S-NSSAI.

For example, when Default S-NSSAI is specified in the response message, the PGW may preferentially select Default S-NSSAI. In addition, when information about priorities of S-NSSAI is included in the response message, the PGW may select at least one S-NSSAI based on the information about the priorities.

Also, according to an embodiment of the present disclosure, the PGW may request another NF to select a network slice. For example, the NF may be an NSSF. However, the present disclosure is not limited to the above example. In FIG. 7, for convenience of description, an NF, from which the PGW requests to select a network slice is described as an NSSF, but is not limited thereto.

According to an embodiment of the present disclosure, the PGW may request the NSSF to select network slice information. The PGW may transmit, to the NSSF, an identifier of a subscriber (SUPI or IMSI), Subscribed NSSAI received from the NF that stores the subscriber information, and a message requesting to select of a network slice including the APN (DNN) received from the user equipment.

Also, according to an embodiment of the present disclosure, the PGW may receive a response message to the request to select of a network slice. The response message may include information about a network slice selected by the NSSF. The information about the network slice selected by the NSSF may include at least one S-NSSAI. That is, the NSSF may select only one S-NSSAI, or may select two or more pieces of S-NSSAI. In addition, the response message received from the NSSF may include which S-NSSAI is default S-NSSAI or priority information among pieces of S-NSSAI. The priority information may be a list.

Also, according to an embodiment of the present disclosure, the PGW may transmit the selected S-NSSAI to the user equipment. For example, the PGW may identify whether there are two or more pieces of S-NSSAI that may be notified to the user equipment, and provide only one S-NSSAI to the user equipment or a plurality of pieces of S-NSSAI to the user equipment.

In other words, the PGW may directly select S-NSSAI, or may request the NSSF to select the S-NSSAI.

In operation 707, the PGW may transmit the network slice information to the MME.

When the response message received from the NSSF includes only one S-NSSAI, this may be notified to the user equipment. When the NSSAI of the response message includes two or more pieces of S-NSSAI and Default S-NSSAI is specified in the response, the PGW may preferentially select the Default S-NSSAI, and when information about priorities among pieces of S-NSSAI is included, the PGW may select and transmit S-NSSAI based on the information about the priorities among the S-NSSAI.

The PGW may also provide a plurality of pieces of S-NSSAI to the user equipment. When there are two or more pieces of S-NSSAI that may be notified to the user equipment, the PGW may transmit one or two or more pieces of S-NSSAI to the user equipment based on information on whether the user equipment is able to receive a plurality of pieces of S-NSSAI.

Also, according to an embodiment of the present disclosure, the PGW may use a Protocol Configuration Option (PCO) or use an ePCO to provide S-NSSAI to be notified to the user equipment.

Figure 8:
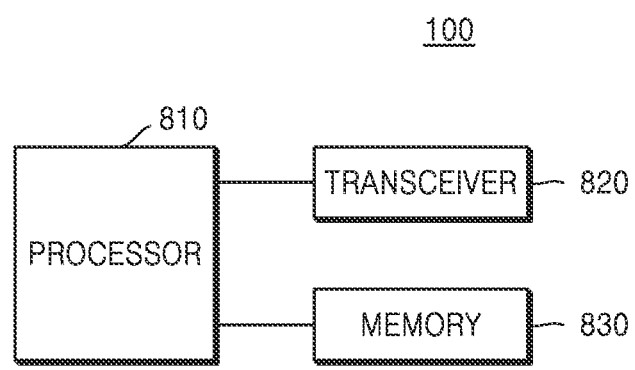
FIG. 8 is a block diagram illustrating a structure of a user equipment according to an embodiment of the present disclosure.

FIG. 8 is a block diagram illustrating a structure of a user equipment according to an embodiment of the present disclosure.

As illustrated in FIG. 8, a user equipment 100 of the present disclosure may include a processor 830, a transceiver 810, and a memory 820. Components of the user equipment 100 are, however, not limited thereto. For example, the user equipment 100 may include more or fewer components than those described above. In addition, the processor 830, the transceiver 810, and the memory 820 may be implemented in the form of a single chip.

According to an embodiment, the processor 830 may control a series of processes in which the user equipment 100 may operate according to the embodiment of the present disclosure described above. For example, in the wireless communication system according to an embodiment of the present disclosure, components of the user equipment 100 may be controlled to provide a service requested by the user equipment 100. The processor 830 may be provided in plurality, and the processor 830 may perform an operation for providing a service, according to the present disclosure described above, by executing a program stored in the memory 820.

The transceiver 810 may transmit or receive signals to or from a base station. A signal transmitted or received to or from a base station may include control information and data. The transceiver 810 may include an RF transmitter for up-converting and amplifying a frequency of a transmitted signal, and an RF receiver for performing low-noise amplification on the received signal and down-converting a frequency of the received signal. This is merely an example, and the components of the transceiver 810 are not limited to the RF transmitter and the RF receiver. In addition, the transceiver 810 may receive a signal via a wireless channel and output the same to the processor 830, and transmit the signal output from the processor 830, via a wireless channel.

According to an embodiment, the memory 820 may store program and data required for operation of the user equipment 100. In addition, the memory 820 may store control information or data included in a signal transmitted or received by the user equipment 100. The memory 820 may include a storage medium such as ROM, RAM, a hard disk, CD-ROM, and DVD, or a combination of storage mediums. Also, there may be a plurality of memories 820. According to an embodiment, the memory 820 may store a program for controlling components of the user equipment to perform the method for supporting inter-system mobility according to the present disclosure.

Figure 9:
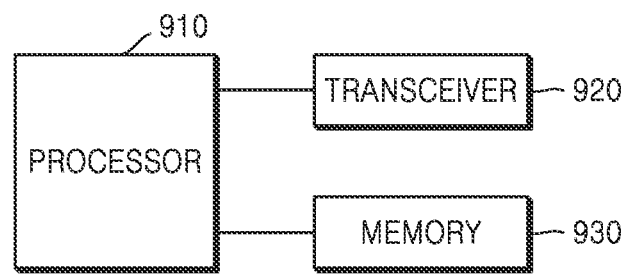
FIG. 9 is a block diagram illustrating a structure of an NF according to an embodiment of the present disclosure.

FIG. 9 is a block diagram illustrating a structure of an NF according to an embodiment of the present disclosure.

FIG. 9 is a block diagram illustrating a structure of an NF (entity, core network entity) in a wireless communication system, according to an embodiment of the present disclosure. The terms such as " . . . unit", " . . . module", and the like used in the present disclosure indicate a unit, which processes at least one function or motion, and the unit and the module may be implemented by hardware or software, or by a combination of hardware and software. According to an embodiment, an NF may include MME, PGW (PGW-C, PGW-U), SGW, UDM, HSS, NSSF, SMF, AMF, etc., and is not limited to the above example, and may include all NFs that may be included in all core networks. Also, the NF of FIG. 9 may correspond to a configuration of a base station.

Referring to FIG. 9, the NF may include a transceiver 910, a memory 920, and a processor 930.

The transceiver 910 may provide an interface for performing communication with other devices in a network. That is, the transceiver 910 may convert a bit string transmitted from the NF to another device, into a physical signal, and convert a physical signal received from another device, into a bit string. That is, the transceiver 910 may transmit or receive a signal. Accordingly, the transceiver 910 may be referred to as a modem, a transmitter, a receiver, a communication unit, or a communication module. Here, the transceiver 910 may allow the NF to communicate with other apparatuses or systems via a backhaul connection (e.g., wired backhaul or wireless backhaul), or other connection methods or networks.

The memory 920 may store data such as a default program, an application program, or configuration information for operating the NF. The memory 920 may be configured with a volatile memory, a non-volatile memory, or a combination of a volatile memory and a non-volatile memory. In particular, the memory 920 may provide stored data according to a request from the processor 930.

The processor 930 may control overall operations of the NF. For example, the processor 930 may transmit or receive a signal via the transceiver 930. Furthermore, the processor 930 may write or read data to or from the memory 920. To this end, the processor 930 may include at least one processor. The processor 930 may control the NF to perform the operations according to the embodiment described above. For example, components of the NF may be controlled to perform the method for supporting inter-system mobility according to the present disclosure.

The methods according to the embodiments disclosed in the claims or the specification of the present disclosure may be implemented as hardware, software, or a combination of hardware and software.

When implemented in software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the present disclosure as described in the claims or the specification.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another optical storage device, or a magnetic cassette. Alternatively, the programs may be stored in memory including a combination of some or all of the above-mentioned storage media. A plurality of such memories may be included.

The programs may also be stored in an attachable storage device which is accessible through a communication network such as the Internet, an intranet, a local area network (LAN), a wireless LAN (WLAN), or a storage area network (SAN), or a combination thereof. Such a storage device may access, via an external port, a device that performs the embodiments of the present disclosure. Furthermore, an additional storage device on a communication network may access a device that performs the embodiments of the present disclosure.

In the embodiments of the present disclosure described above, a component or components included in the present disclosure are expressed in a singular or plural form depending on the described embodiments of the present disclosure. However, the singular or plural form is appropriately selected for convenience of description, and the present disclosure is not limited thereto. As such, a component expressed in a plural form may also be configured as a single component, and a component expressed in a singular form may also be configured as plural components.

In the detailed description of the present disclosure, specific embodiments have been described, but it various modifications may also be made without departing from the scope of the present disclosure. Thus, the scope of the present disclosure is not limited to the embodiments described herein and should be defined by the appended claims and their equivalents. In other words, it is obvious to those skilled in the art that other modifications based on the technical spirit of the present disclosure can be implemented. Also, when necessary, the above respective embodiments may be employed in combination. For example, portions of the methods provided by the present disclosure may be combined with each other to enable a base station and a user equipment to operate. Also, although the above embodiments have been presented with reference to 5G and NR systems, other modifications based on the technical spirit of the embodiments may also be implemented in connection with other systems such as LTE, LTE-A, and LTE-A-Pro systems.

The invention claimed is:

1. A method of supporting inter-system mobility of a first entity, the method comprising:
receiving a create session request message including information about an Access Point Name (APN), for which a user equipment requests a packet data network (PDN) connection, subscriber identification information of the user equipment, and a field indicating capability information of the user equipment about slice identification information;
determining, based on the create session request message, whether movement to a 5G system (5GS) is required for the PDN connection;
transmitting, based on a result of the determining, to a second entity, a subscriber information request including the subscriber identification information and the APN information;
receiving, from the second entity, a response to the subscriber information request including identification information of one or more subscribed network slices corresponding to the subscriber identification information; and
providing, to the user equipment, at least one piece of identification information of the one or more subscribed network slices.

2. The method of claim 1, wherein the capability information of the user equipment about slice identification information comprises information indicating whether the user equipment is able to receive two or more pieces of network slice identification information, and
the providing of the at least one piece of identification information of the one or more subscribed network slices to the user equipment comprises providing, to the user equipment, one piece of identification information of the one or more subscribed network slices or a plurality of pieces of network slice identification information, based on the field indicating the capability information of the user equipment about slice identification information.

3. The method of claim 1, wherein the at least one piece of identification information of the one or more subscribed network slices provided to the user equipment is included in a certain field in a create session response message.

4. The method of claim 1, further comprising:
transmitting, to a third entity, a message requesting to select a network slice based on the identification information of the one or more subscribed network slices; and
receiving a response message including one or more pieces of slice identification information selected by the third entity among the identification information of the one or more subscribed network slices,
wherein the providing of the at least one piece of identification information of the one or more subscribed network slices to the user equipment comprises transmitting at least one piece of the selected slice identification information, to the user equipment.

5. The method of claim 1, wherein, when a response to the subscriber information request includes two or more pieces of network slice identification information,
the response to the subscriber information request includes information for determining a default network slice, or
information about priorities among the two or more pieces network slice identification information.

6. The method of claim 1, wherein the at least one piece of identification information of the one or more subscribed network slices provided to the user equipment is used when the user equipment moves to the 5GS.

7. The method of claim 4, wherein the first entity comprises a combo node of a PDN gate way control (PGW-C) of an Evolved packet system (EPS) and a Session Management Function (SMF) of the 5GS, the second entity comprises one of Unified Data Management (UDM), Home Subscriber Server (HSS), Unified Data Repository (UDR), and the third entity comprises a Network Slice Selection Function (NSSF).

8. A first entity supporting inter-system mobility, the first entity comprising:
a transceiver; and
a processor coupled to the transceiver and configured to receive a create session request message including information about an Access Point Name (APN), for which a user equipment requests a packet data network (PDN) connection, subscriber identification information of the user equipment, and a field indicating capability information of the user equipment about slice identification information, determine, based on the create session request message, whether movement to a 5G system (5GS) is required for the PDN connection, transmit, based on a result of the determining, to a second entity, a subscriber information request including the subscriber identification information and the APN information, receive, from the second entity, a response to the subscriber information request including identification information of one or more subscribed network slices corresponding to the subscriber identification information, and provide, to the user equipment, at least one piece of the identification information of the one or more subscribed network slices.

9. The first entity of claim 8, wherein the capability information about the slice identification information of the user equipment comprises information indicating whether the user equipment is able to receive two or more pieces of network slice identification information, and the processor is further configured to provide, to the user equipment, one piece of identification information of the one or more subscribed network slices or a plurality of pieces of network slice identification information, based on the field indicating the capability information about the slice identification information of the user equipment.

10. The first entity of claim 8, wherein the at least one piece of identification information of the one or more subscribed network slices provided to the user equipment is included in a certain field in a create session response message.

11. The first entity of claim 8, wherein the processor is further configured to transmit, to a third entity, a message requesting to select a network slice based on the identification information of the one or more subscribed network slices, receive a response message including one or more pieces of slice identification information selected by the third entity among the identification information of the one or more subscribed network slices, and transmit at least one piece of the selected slice identification information, to the user equipment.

12. The first entity of claim 8, wherein, when the response to the subscriber information request includes two or more pieces of network slice identification information, the response to the subscriber information request includes information for determining a default network slice, or information about priorities among the two or more pieces of network slice identification information.

13. The first entity of claim 11, wherein the first entity comprises a combo node of a PDN gate way control (PGW-C) of an Evolved packet system (EPS) and a Session Management Function (SMF) of 5GS, the second entity comprises one of Unified Data Management (UDM), Home Subscriber Server (HSS), Unified Data Repository (UDR), and the third entity comprises a Network Slice Selection Function (NSSF).

* * * * *